May 30, 1939. H. L. PITMAN 2,160,487
COMBINED TYPEWRITING AND COMPUTING MACHINE
Filed April 2, 1936 10 Sheets-Sheet 2

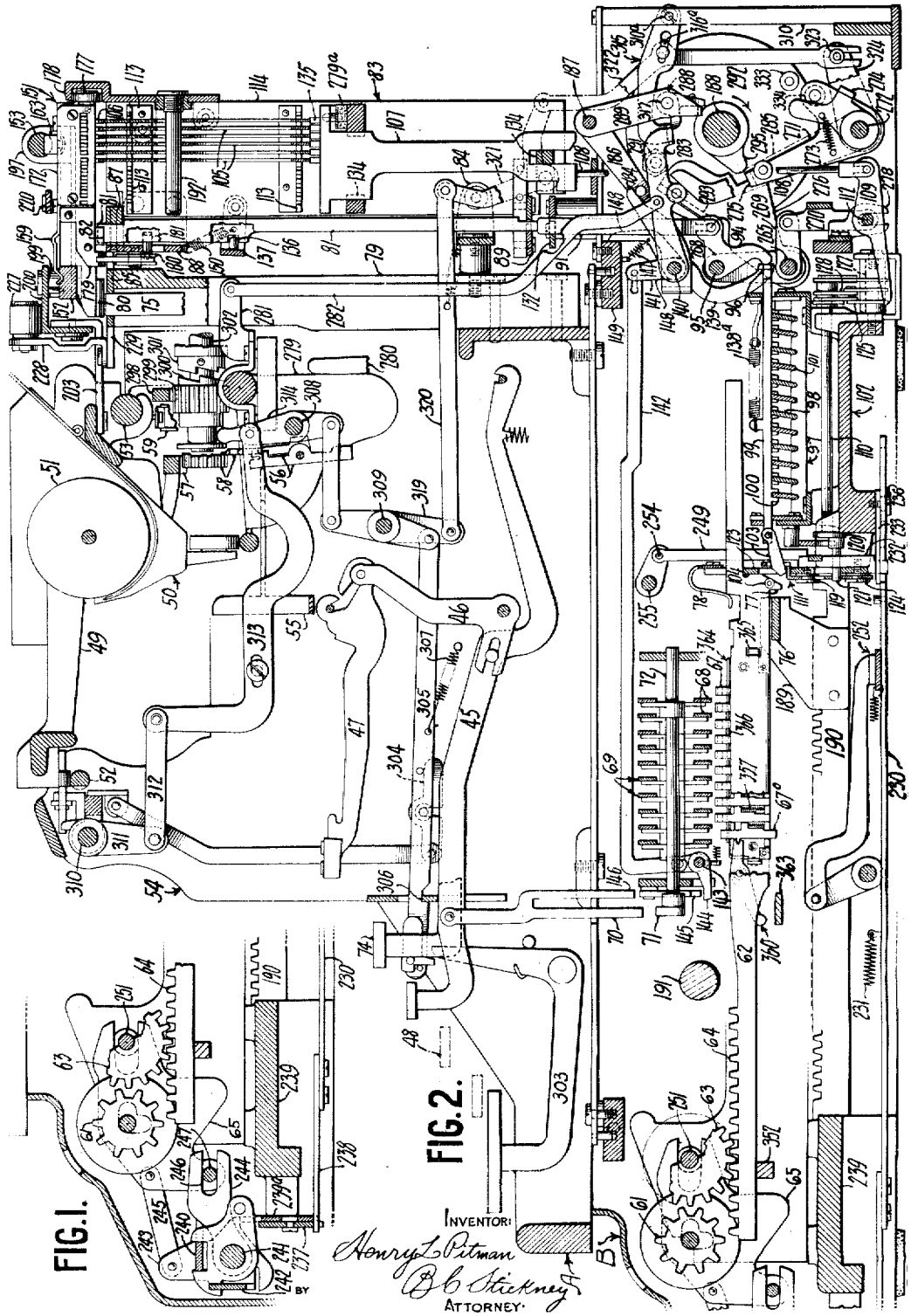

INVENTOR:
Henry L. Pitman
BY O. C. Stickney
ATTORNEY.

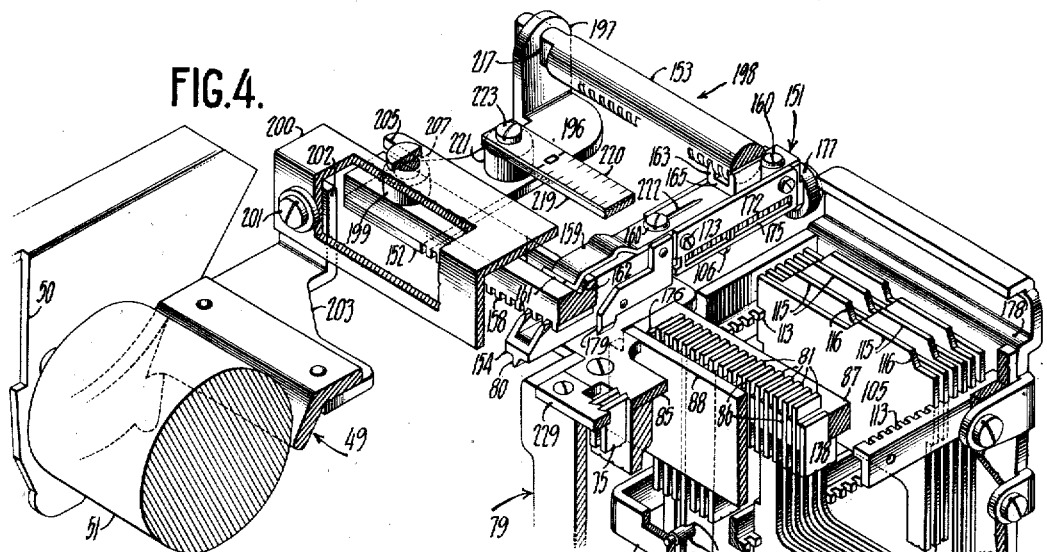

May 30, 1939.  H. L. PITMAN  2,160,487
COMBINED TYPEWRITING AND COMPUTING MACHINE
Filed April 2, 1936   10 Sheets-Sheet 4
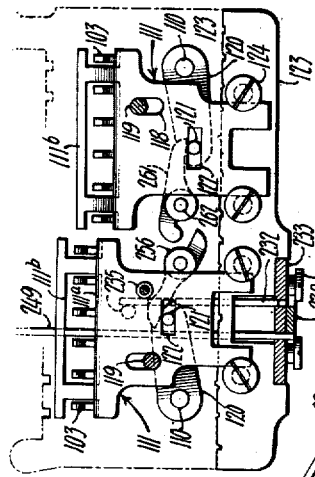
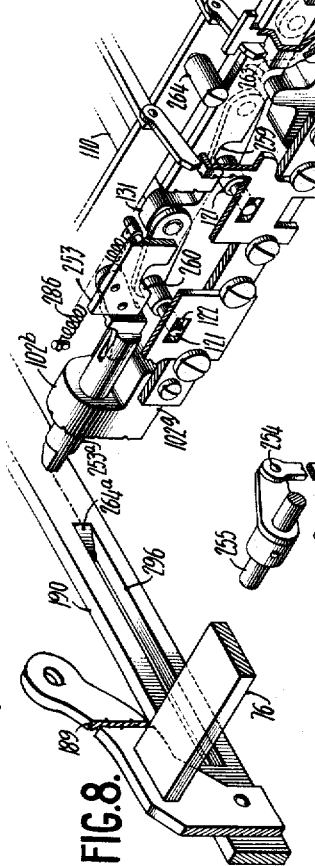
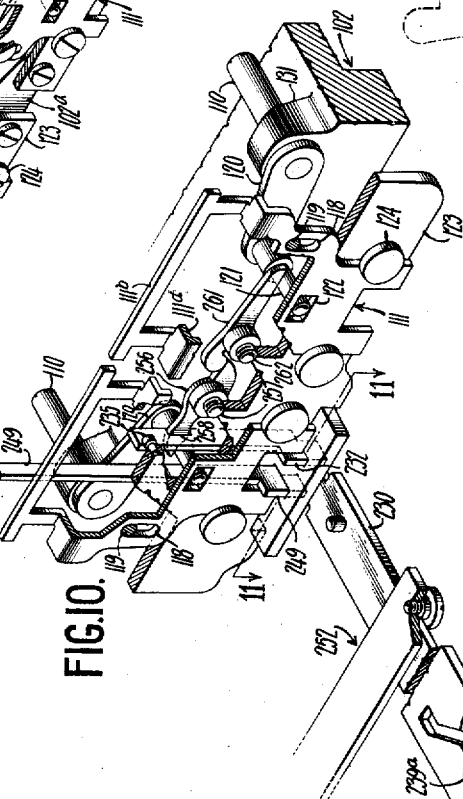
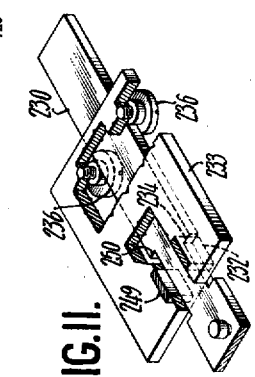
INVENTOR:
Henry L. Pitman
BY B. L. Stickney
ATTORNEY.

May 30, 1939.  H. L. PITMAN  2,160,487
COMBINED TYPEWRITING AND COMPUTING MACHINE
Filed April 2, 1936  10 Sheets-Sheet 5
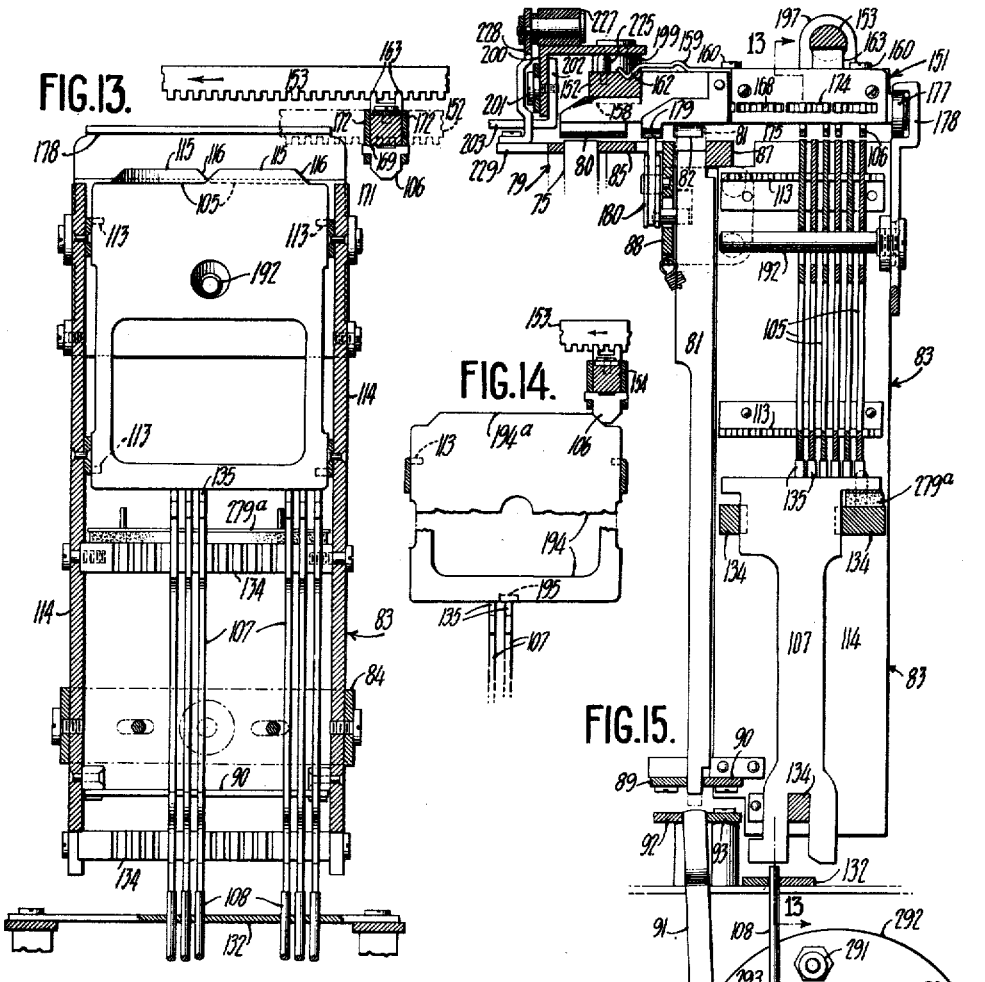
INVENTOR:
Henry L. Pitman
BY B C Stickney
ATTORNEY.

May 30, 1939. H. L. PITMAN 2,160,487
COMBINED TYPEWRITING AND COMPUTING MACHINE
Filed April 2, 1936 10 Sheets-Sheet 6
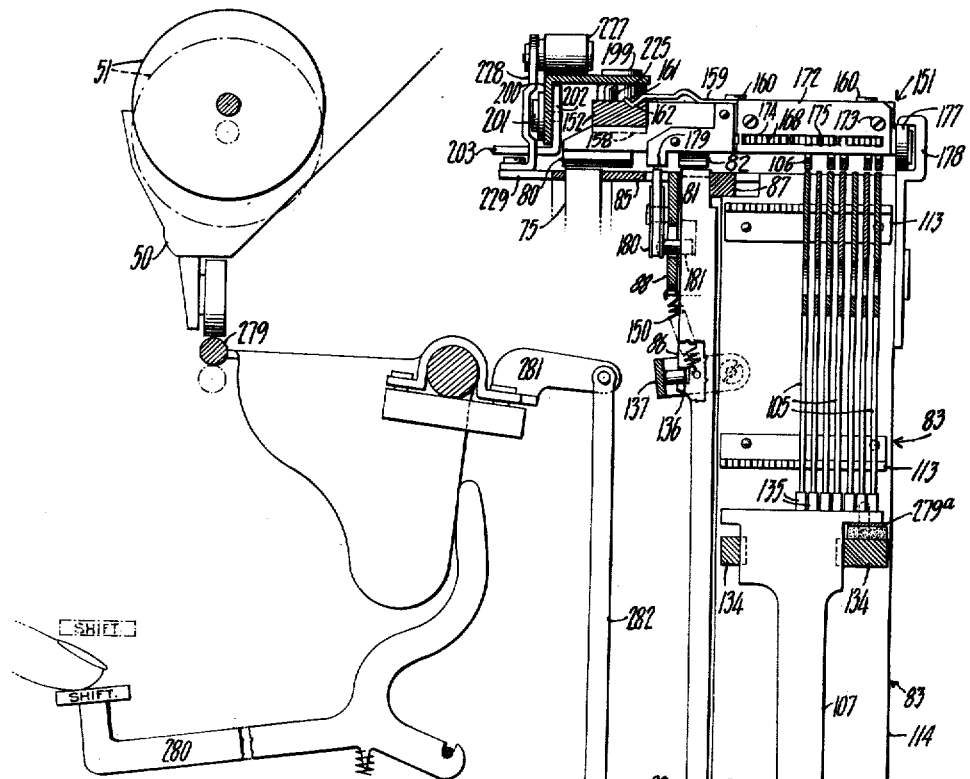
FIG.16.
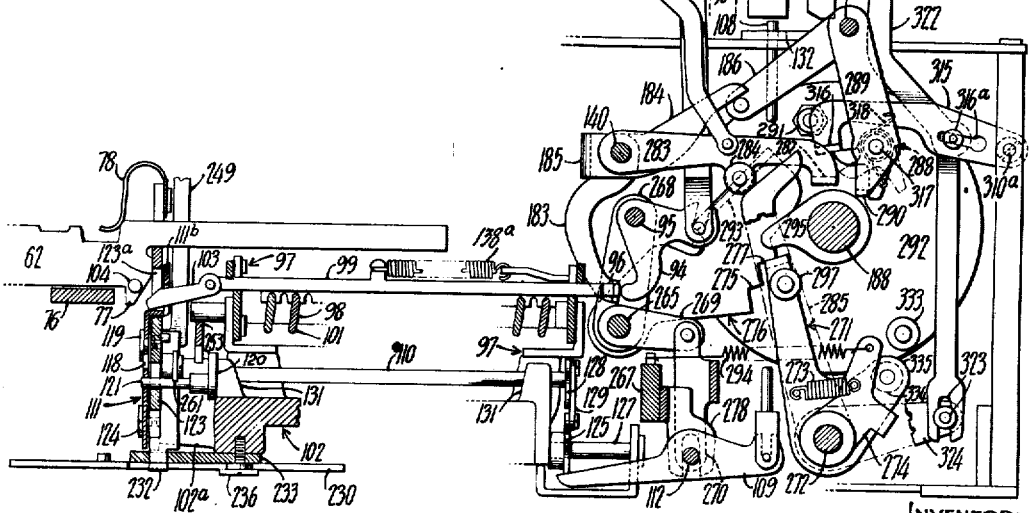
INVENTOR:
Henry L Pitman
BY B.C. Stickney
ATTORNEY.

May 30, 1939.  H. L. PITMAN  2,160,487
COMBINED TYPEWRITING AND COMPUTING MACHINE
Filed April 2, 1936   10 Sheets-Sheet 7
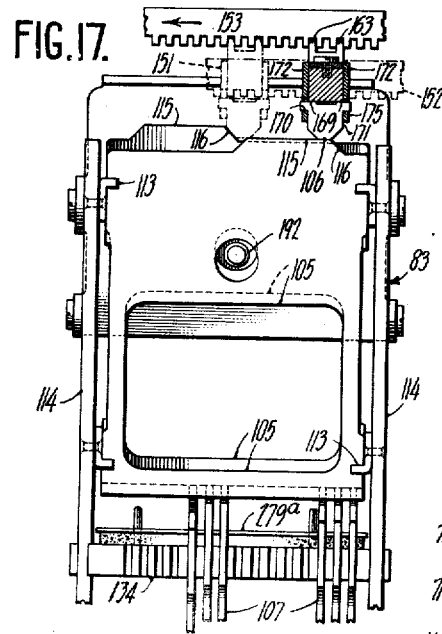
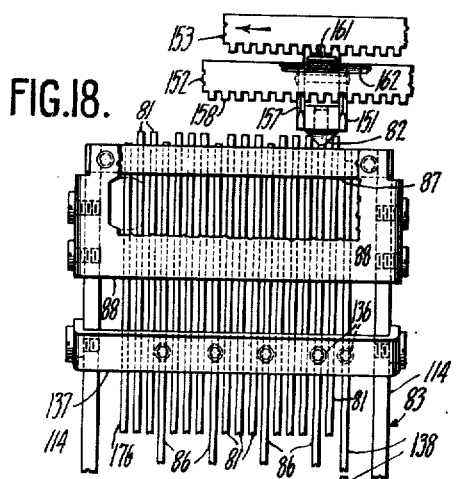
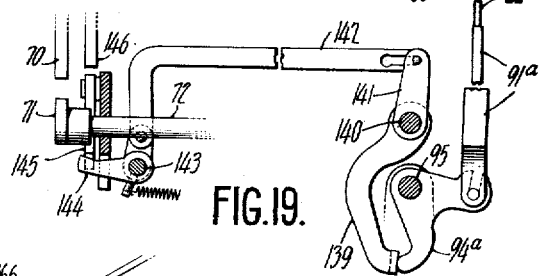
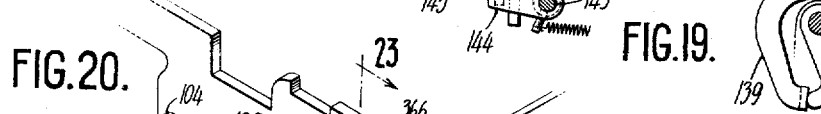
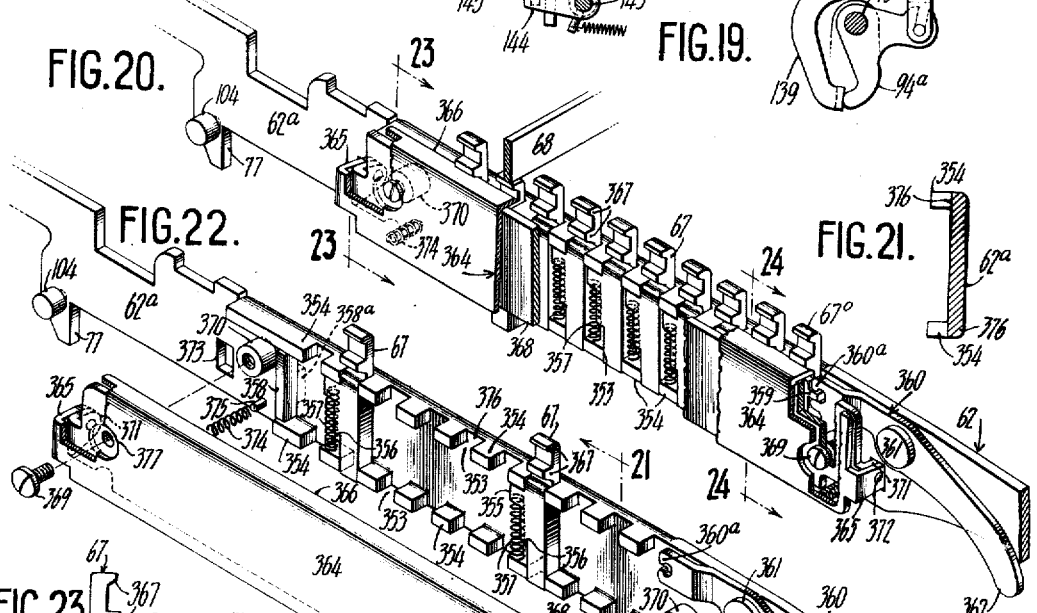
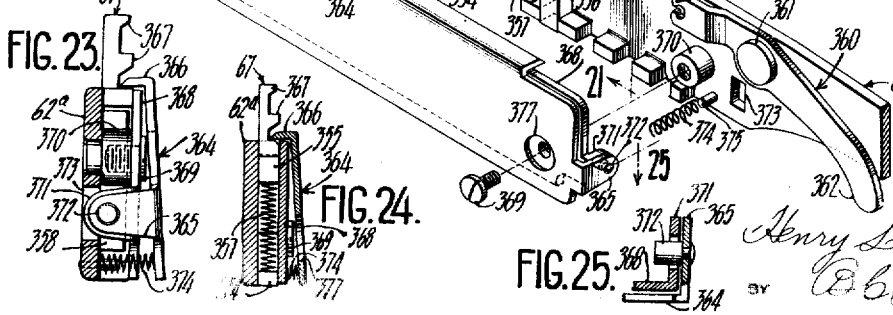

May 30, 1939.  H. L. PITMAN  2,160,487
COMBINED TYPEWRITING AND COMPUTING MACHINE
Filed April 2, 1936   10 Sheets-Sheet 8
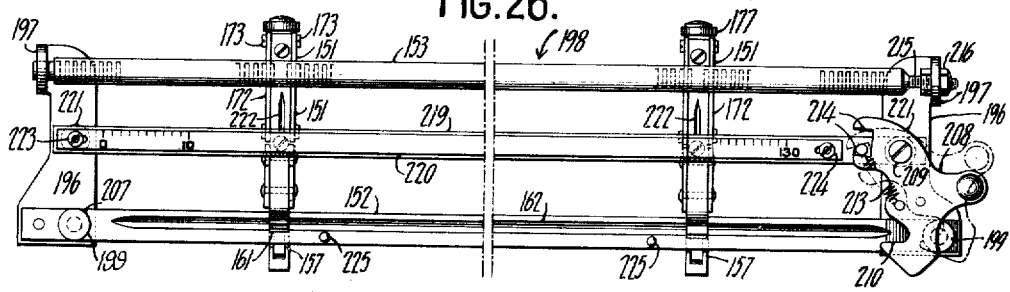
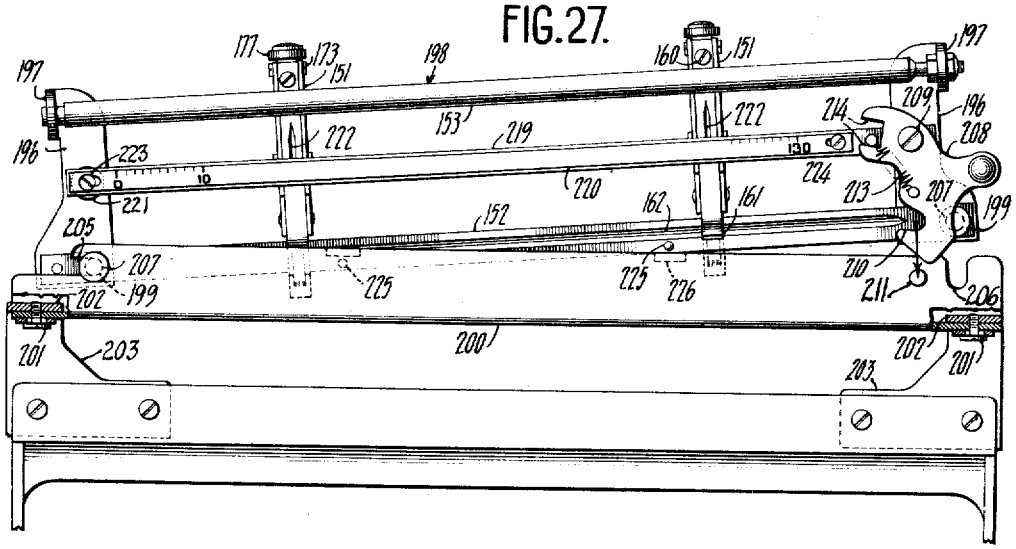
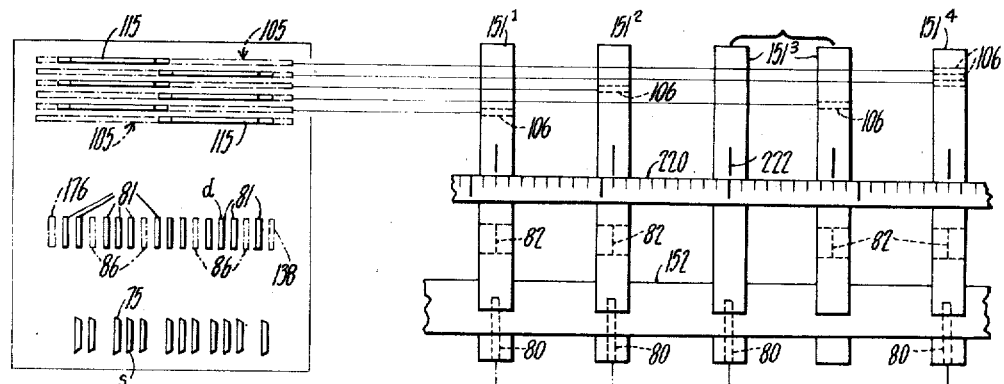
INVENTOR:
Henry L Pitman
BY B C Stickney
ATTORNEY.

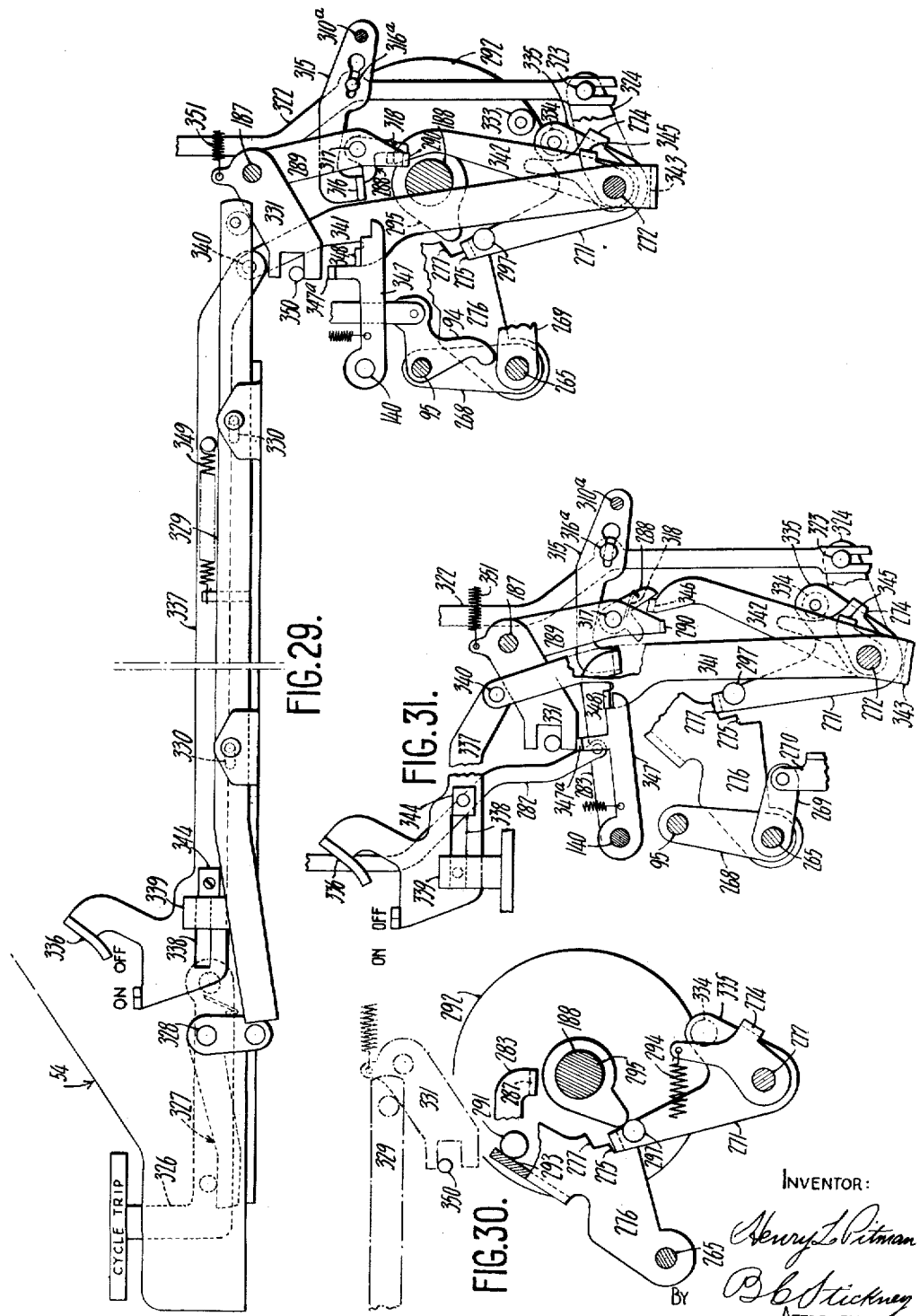

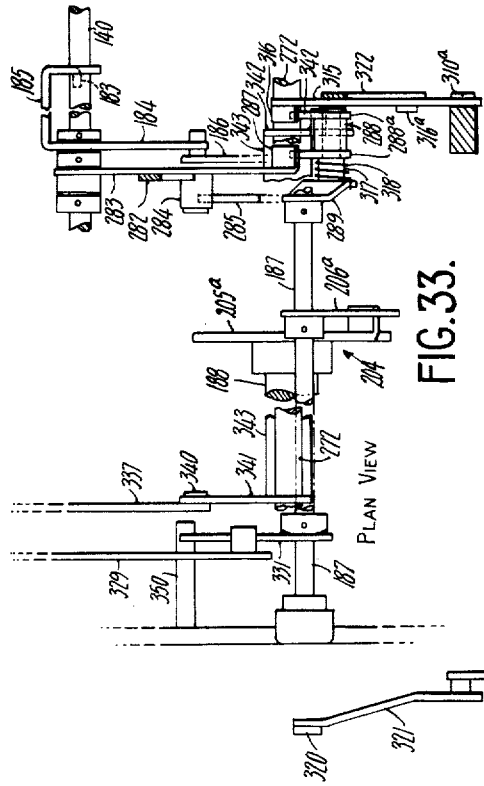
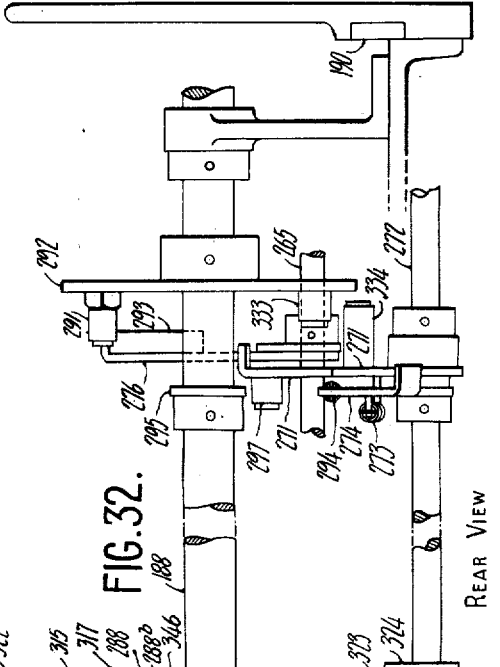
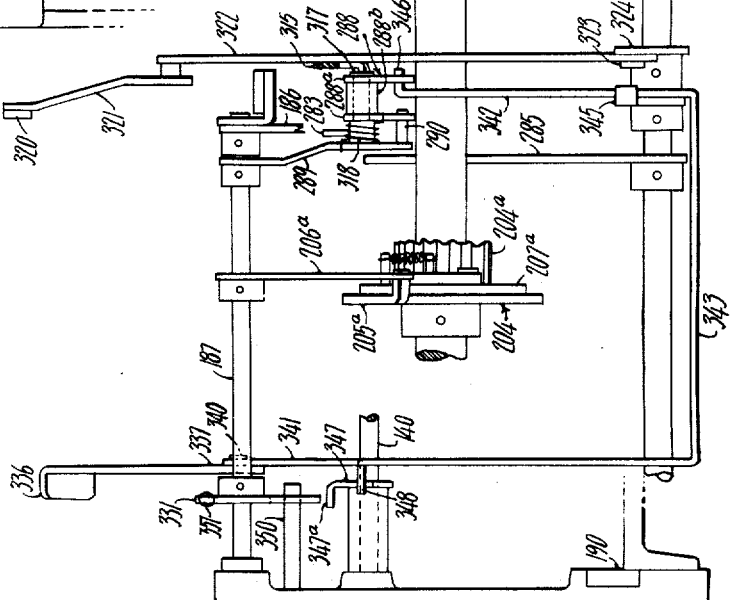

Patented May 30, 1939

2,160,487

UNITED STATES PATENT OFFICE 2,160,487

COMBINED TYPEWRITING AND COMPUTING MACHINE

Henry L. Pitman, Hartford, Conn., assignor to Underwood Elliott Fisher Company, New York, N. Y., a corporation of Delaware Application April 2, 1936, Serial No. 72,348

7 Claims. (Cl. 235—60)

This invention relates to a combined typewriting and computing machine of the Underwood-Hanson class, exemplified in my United States Patent 1,927,951, dated September 26, 1933.

In said machine, typewriting mechanism is operatively connected to a computing mechanism which includes one or more sets of computing wheels, a set of indexable drivers for each set of wheels and a general operator for the drivers. Operation of the numeral-type keys to print an amount, while the letter-feed carriage traverses a computing zone, causes said amount to be indexed in said drivers; the carriage acting at said zone, by means of denomination-selecting mechanism, to shift the drivers seriatim into position wherein numeral-type-key-operated digit-indexing mechanism is effective to set digit-pins in the drivers. The general operator is cycled after the idexing of the drivers to actuate the latter, by means of the set digit-pins, to accumulate said amount in the computing wheels.

Totals are accumulated, according to item classification, in different registers, each of which may be of large grand-total capacity, say a capacity of twelve denominations. With reference to lesser totals, which may never exceed say six denominations, the large register has an excess capacity.

An object of the invention is to make provision for utilizing said excess capacity or higher denominations of a register for accumulating a lesser total, aside from another lesser total which may be accumulated in the lower denominations of the register. Thus, instead of having say two individual or separate register-units, each of large grand-total capacity, the machine would have, comparatively, a single register of large capacity for large totals, and usable sectionally for accumulating two or more lesser totals.

The invention provides novel means for selecting automatically, under control of the carriage, different sections of a register. For example, the carriage, at a given computing zone, may effect, by said means, selection of one section of the large capacity register for one lesser-total classification, and may effect, at another zone, selection of another section of said same register for another lesser-total classification. Said novel means include provision whereby the carriage may effect, at a given zone, selection of two or more sections of the register for a total or item involving up to the full-register capacity of denominations. In accordance with these aims, the invention also makes novel provision whereby the denomination-selecting mechanism and denominational tabulating-key mechanism, which are each of full-register range of denominations, are properly correlated to the sectional or full use of the register. By said latter provision, tabulation of the carriage to the units denomination of a computing zone, for example, would cause the carriage at said denomination to select the computing-wheel driver which corresponds to the units denomination of whichever register-section is selected for said zone and shift said driver to the above-mentioned indexing position.

A localized field of register-controls traversed by the typewriter-carriage includes a series of denominational jacks serving to shift the computing-wheel drivers seriatim to said indexing positions, one jack for each denomination of the register of large grand-total capacity. Said localized control field also includes, for each predetermined sectional part of a large capacity register, an element which is selectably engaged by the carriage to determine use of said sectional part of the register at a computing zone.

The invention is applicable to a machine having one or more than one of the large capacity registers, in that it may be applied to operate one or more of said large registers sectionally.

For example, in the herein-illustrated machine, three register units of large capacity are shown, and each register unit is usable by means of the invention as a large capacity register, or sectionally as two lesser capacity registers. Only one series of denominational jacks is provided consonantly with the localization of the field of register-controls; and said single or master series of jacks may have connections ramifying to the several sets of computing-wheel drivers corresponding to the plurality of large capacity register units. The several sets of branches, into which said connections ramify, are normally disconnected from their corresponding sets of computing-wheel drivers. For the purpose of the invention, a set of the computing-wheel drivers may be connected sectionally to its set of branches of the series of denominational jacks, in that, while one section of the set of the computing-wheel drivers is connected to the companion ones of said set of branches, another section of the same set of drivers is not so connected, this being effected under the control of the typewriter-carriage by means of the above-mentioned register-section-selecting elements included in said localized field of register-controls.

Said register-section-selecting elements are controllable by tappets provided on the carriage, and said elements and tappets are proportioned so that the control is coextensive with the number of denominations of the register-section. One of said tappets is provided for each amount-computing column of the work-sheet, and a denomination-selecting tappet, for traversing the set of denominational jacks, is also provided on the carriage for each work-sheet column. The provision of said register-section-selecting elements and tappets to effect control which is limited to the number of denominations of the register-sections controlled by the respective ones of said elements, makes it feasible to make the spacing of the work-sheet columns or zones substantially commensurate with the number of register-denominations used for each column, whereby excessive separation of the work-sheet columns, on account of use of the large capacity register for accumulating small items, is avoided.

Certain features of the invention relate to novel means whereby a state-controller, which in the present machine is provided for each register unit of large capacity, serves for predetermining addition or subtraction for either of the register sections as well as for the entire register unit.

The invention also deals with the provision of improved means for silencing the register-controls, as, for example, during operation of the type-writer-carriage in uppercase typing. A novel latch-device maintains the register-controls in operative relation to the carriage, and may be tripped, with little effort, to silence operation by the carriage of said register-controls.

Coincident with a shift to upper case, for example, said latch-device is tripped, and, the tripping requiring very little effort, the usual ease of touch of the case-shift key is not impaired. Coincident with the shift back to lower case, a power-operated cycling mechanism provided in the computing base is tripped to effect restoration of the register-controls to the control of the carriage; said cycling mechanism being thus used as the power-operated medium to relieve the case-shift key of any burden incident to the silencing of the register-controls. Provision may be made whereby said latch-device and cycling mechanism are tripped in appropriate order to respectively silence and restore operativeness of the register-controls in conjunction with starting and stopping operation of a power-operable carriage-return mechanism. A non-compute key may trip said latch-device for silencing operativeness of the register-controls, but is not operative to trip the cycling mechanism, since it is desired that the machine shall remain in non-computing condition until the register-controls are restored to operativeness by tripping the cycling mechanism independently, as for example, by manually operating the manual cycling-tripping key. Since, in the computing state of the machine, operation of the case-shift mechanism or of the carriage-return mechanism first silences and then restores operativeness of the register-controls, novel provision is made whereby, during the non-computing state of the machine effected by means of the non-computing key, the register-control-restoring function of the case-shift and carriage-return mechanisms is silenced.

A tappet-unit is placed on the carriage for each computing zone and may include a tooth for engaging the denominational jacks, and a register-selecting tappet which is differently locatable on the tappet unit for engaging a certain register-selecting element. Novel improvements in the tappet-unit, in the rack structure on the carriage which supports said unit, and in devices which brace said rack structure, conduce to proper operation of the register-controls and facilitate setting up the tappet-units for different arrangements of work-sheets.

The invention also deals with improvements over the co-pending application No. 563,033 of O. Thieme, filed September 16, 1931 now Patent No. 2,075,557, dated March 30, 1937, said improvements pertaining to the construction of the computing-wheel drivers or register-bars which each have settable digit-pins and means whereby the setting of a digit-pin restores a pin which was previously set; the improvements conducing to economy in the manufacture of the parts constituting the computing-wheel drivers and to enduring serviceability of said parts.

Other features and advantages will hereinafter appear.

In the accompanying drawings:

Figure 1 represents a continuation of the left side of Figure 2.

Figure 2 is a sectional side elevation of the combined typewriting and computing machine including mechanism in which the invention is embodied.

Figure 3:
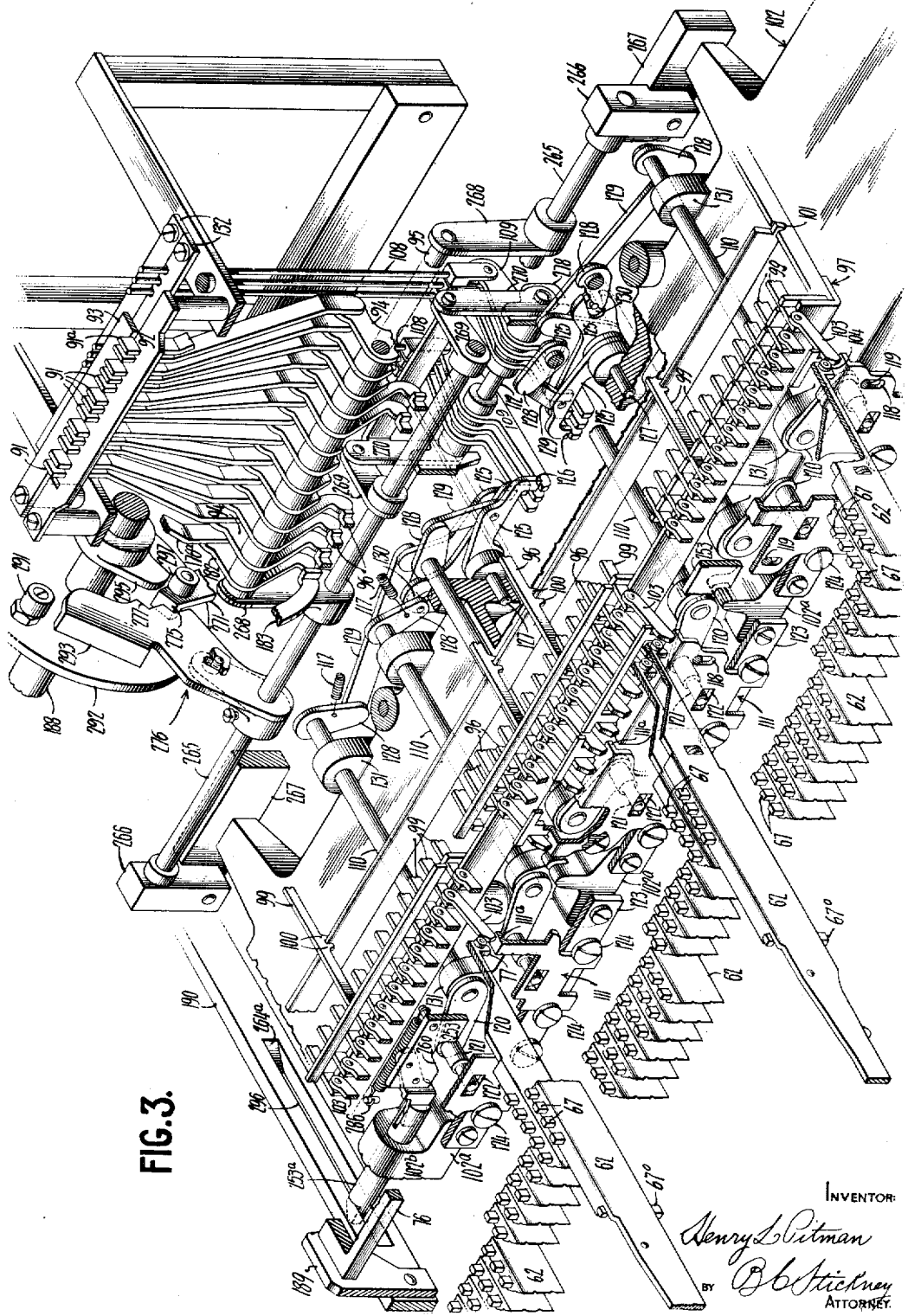

Figure 3 is a perspective of the mechanism in the computing base comprising the lower portion of the set of denominational selecting trains, the means whereby said trains ramify to a plurality of sets of computing-wheel drivers or register-bars and the means whereby one or more sets of computing-wheel drivers are connectible sectionally to said denomination trains, some of the parts being sectioned to clarify details.

Figure 4 is a perspective, companion to Figure 3, showing the upper mechanism whereby the typewriter carriage controls the portions of the denomination and register section selecting mechanisms seen in Figure 3.

Figure 5 is a perspective of the novel tappet-unit, some of the parts being shown apart from the unit to clarify details.

Figures 6 and 7 are cross-section views of the tappet-unit taken respectively on the traces 6—6 and 7—7 of Figure 5.

Figure 8 is a perspective, partly sectionel, of a portion of the register-section selecting mechanism in the computing base and the means whereby operation of the cycling mechanism serves to insure restoration of said selecting mechanism.

Figure 9 is a front view, partly sectioned, of the devices which sectionally operate the set of couplers that connect the register-bars to the denomination-selecting trains; and shows the means for effecting withdrawal of a state-controller latch at selective operation of said devices.

Figure 10 shows the mechanism of Figure 9 in perspective, the couplers being omitted, and some of the parts sectional to bring out details.

Figure 11 is a fragmentary perspective of the state-controller and latches therefor, and corresponds to a section on the trace 11—11 of Figure 10.

Figure 12 is similar to Figure 9, the latter representing the state-controller latch withdrawn at engagement of one section of the set of couplers, while Figure 12 shows said latch withdrawn by engagement of another section of the couplers.

Figure 13 is a front view of the set of register-selecting elements, the companion slides and the carriage-tappet unit for actuating said elements; the view corresponding to a section on the trace 13—13 of Figure 14.

Figure 14 is a front view of the tappet-unit and a register-selecting element that is coextensive with two sections of the register and shows said element operatively connected to two slides for controlling both sections of the register.

Figure 15 is a sectional side view, showing the tappet-unit and its supports, and also showing the denomination and register selecting trains or controls, and the latch-device which normally maintains said controls in operative condition;

the view representing said latch-device as being tripped near the start of a cycling operation.

Figure 16 is a sectional side view of the register-control mechanism and the mechanism for silencing and restoring operativeness of said mechanism.

Figure 17 is a front view of the register-section-selecting elements and companion slides, and represents the engagement of one of said elements by the tappet-unit.

Figure 18 is a front view of the set of denomination and punctuation jacks, and represents the tappet-unit in engagement with one of the punctuation jacks for actuating a key-lock.

Figure 19 is a side view of the key-lock and the connections from the latter to the set of punctuation jacks.

Figure 20 is a perspective of the improved register-bar, partly sectioned to clarify details.

Figure 21 is a cross-section of the body of the register-bar, on the trace 21—21 of Figure 22.

Figure 22 is a perspective of the register-bar parts separated to clarify details.

Figures 23 and 24 are cross-sections of the register-bar assembly, taken respectively on the traces 23—23 and 24—24 of Figure 20.

Figure 25 is a sectional view on the trace 25 of Figure 22, showing details of the pivotal connection of a digit-pin interlock to a digit-pin keeper.

Figure 26 is a plan of the improved detachable rack-structure for the tappet-units.

Figure 27 is a plan of the tappet-unit rack-structure and the part of the carriage to which it is removably attachable as illustrated.

Figure 28 is a diagram illustrating a work-sheet form and a corresponding set-up of tappet-units on the typewriter-carriage relatively to the register-controls.

Figure 29 is a side elevation, showing a non-compute-key mechanism and the means controllable thereby for silencing the register-controls, the parts being shown in their normal positions for using the machine for computing.

Figure 30 is a side elevation showing the operation of a cycling shaft to restore the latch-devices which were tripped for silencing the register-controls.

Figure 31 is a side elevation showing the non-compute-key set to condition the machine for non-computing, and the means actuated thereby to silence the register-controls, and to operatively disconnect a cycle-tripping device from the case-shift and carriage-return controls for said device.

Figure 32 is a rear elevation of the latch-device and co-operative means, in the computing base, for silencing the register-controls.

Figure 33 is a plan view of a portion of the mechanism, seen in Figure 32, and parts related thereto.

In a machine of the Underwood-Hanson class, a typewriter-unit A surmounts a computing base B, Figure 2.

45, 46 and 47 represent, respectively, the key-levers, bell-cranks and type-bars of the numeral-type actions of the typing system, the alphabet type-actions being represented by the alphabet-keys 48. The usual letter-feeding carriage 49 supports a case-shiftable frame 50, in which a platen 51 is journaled, said carriage running upon rails 52, 53 mounted in the typewriter-frame 54.

At operation of any type-action, the usual universal bar 55, escapement-dogs 56, feed-rack 57, escapement-wheel 58 and carriage spring-motor 59 co-operate to letter-feed the carriage 49.

The computing base B may have one or more register-units. The register-unit is of the kind shown in my aforesaid Patent 1,927,951, in that provision for driving its computing wheels 61 oppositely for addition and direct subtraction includes a set of register-bars 62 and idlers 63 permanently in mesh with racks 64 on said register-bars. Said computing wheels 61 normally stand disengaged both from said idlers 63 and said racks 64, Figures 1 and 2, and means for shifting them rearwardly to mesh with said idlers, or downwardly to mesh with said racks, include a shiftable frame 65, in which said computing wheels 61 are mounted.

Each register-bar has digit-pins 67, 67°. For setting a digit-pin 67 in a register-bar, the latter must be slightly advanced to align its pins 67 with pin-setting bars 68 which form part of the usual set of Underwood-Hanson pin-setting linkages 69 representing different digits. Each numeral key-lever 45 has a pendent rod 70 to engage an arm 71 of a rock-shaft 72 to rock the latter and thereby actuate the corresponding linkage 69 to set, in whichever register-bar is slightly advanced, the digit-pin 67 corresponding to said numeral key-lever 45, each linkage 69 including one of said rock-shafts 72.

A denominational tabulating mechanism is represented by denominational tabulating keys 74, Figure 2, and denominational carriage-stops 75. Said denominational keys 74, stops 75, and the co-operating carriage-release means, not shown, may be of the kind shown in Helmond Patent No. 1,858,447, dated May 17, 1932.

The machine is shown as having three register-units, each register-unit having its individual set of register-bars 62 as represented in Figure 3; it being understood that, for driving the companion set of computing wheels 61 reversely, there are associated with each set of register-bars 62 a set of the idlers 63 and the shiftable frame 65 for said computing wheels.

The usual reciprocatory cross-bar 76 of the cycling mechanism is common to all of the register-bars 62. Said cross-bar 76 coacts with the digit-pins 67, set in its path by the indexing operation, to advance the register-bars to the indexed extents at the advance stroke of said cross-bar, the computing wheels 61 having been first shifted, as will be explained later on, to engage either the racks 64 or the idlers 63. At the return stroke of the cycling cross-bar 76, the latter engages shoulders 77 of the advanced register-bars 62 to return the latter, the computing wheels 61 having been disengaged first from the racks 64 or idlers 63. The usual spring-devices 78 become effective to retract the returned register-bars sufficiently from said cross-bar 76, after the latter has reached the end of its return stroke, to permit the aforesaid slight advance of the register-bars for the pin-setting operations.

Each of the three register-units is represented herein, by way of example, as having twelve register-bars 62 for accumulating totals up to twelve denominations. For each of said twelve denominations, there is a denominational tabulating stop 75 and its companion key 74. The denominational stops 75 are guided vertically in a housing 79 on the typewriter-frame 54, and, for each computing zone of the carriage 49, the latter presents a counter-stop 80 which is engaged by any upwardly projected denominational stop 75 to arrest the tabulating advance of the carriage at a corresponding denomination in said zone.

A set of denominational jacks 81 corresponds in number to the number of denominations (twelve) in a register-unit, and is grouped behind the set of denominational carriage-stops 75. Said set of jacks is common to the several sets of register-bars 62, and the carriage presents for each computing zone a tappet 82 for depressing said jacks seriatim as the carriage traverses said zone step by step at operation of the numeral-type actions.

Said denominational jacks 81 are in the form of rods guided vertically in a housing 83, which is supported by attachment to the denominational carriage-stop housing 79, by means of a lower bracket 84, and an upper bracket-plate 85 which also spaces and guides said denominational tabulating stops 75. For spacing and guiding the denominational jacks 81 and similar punctuation jacks 86, which are interspaced with said denominational jacks, the housing 83 has an upper slotted guide-bar 87 and a companion face-plate 88, and also has lower guide-plates 89, 90. The denominational jacks 81 are incorporated in the typewriter-unit A and abut against companion rods 91 in the computing base B, the latter being provided with guide-plates 92, 93, for spacing and guiding said rods 91 at their upper ends. Said rods 91 diverge to correspond in spacing, at their lower ends, with a set of bell-cranks 94 mounted on a fulcrum-rod 95, said bell-cranks 94 connecting said rods 91 to a set of denominational horizontal rods 96, mounted for endwise movement in a frame 97.

Said horizontal rods 96, bell-cranks 94, vertical rods 91 and denominational jacks 81 form a master set of denominational trains, which for the purpose of the invention, may ramify to the register-bars 62 of the several register-units. For accomplishing such ramification use is preferably made of certain devices, set forth in my copending application Serial No. 604,691, filed April 12, 1932, namely, a bed of cross-blades 98, one for each denomination, and sets of distributive racks 99 corresponding to the sets of register-bars 62, and connected by said cross-blades 98 to said rods or master-racks 96; each cross-blade 98 being connected to a master-rack 96 and all of the distributive racks 99 of the same denomination by teeth 100, provided on each rack 96, 99. The cross-blades are rockable upon their lower edges in notches 101 afforded by the frame 97, which is supported by a cross-member 102 of the computing base framework.

For connection and disconnection to and from its companion register-bar 62, each distributive rack 99 has hinged thereto an arm or coupler 103. The full and dotted outlines in Figure 15 represent, respectively, the normal or ineffective, and the effective positions of the coupler 103. In the effective position, the coupler 103, by engagement with a roll 104 on the register-bar 62, operatively connects the latter with the distributive rack 99, so that a slight advance of said rack 99 by the companion carriage-actuated master-denominational train is transmitted to said register-bar 62, to bring its digit-pins 67 under the pin-setting bars 68. With the coupler in ineffective position, said slight advance of the distributive rack 99 has no effect on the register-bar 62.

For selectively using the register-unit sectionally novel means are provided whereby the set of couplers for the register-unit may be controlled sectionally by the carriage. For example, in the herein-shown register-unit of twelve denominations, the section of six couplers 103 for the six highest denominations and the section of six couplers 103 for the six lowest denominations, may be controlled independently of one another. In this way, the section of six highest denominations of the twelve denomination register-unit and the section of six lowest denominations of said register-unit, may be used independently, as for accumulating separate totals in each section.

The novel organization is arranged, by way of example, for using the section of six highest and the section of six lowest denominations of each of the three twelve denomination register-units, herein shown, separately; so that the three twelve-denomination register-units afford six register-sections of six denominations each. For each register-section there is an independent train, whereby the carriage controls the corresponding section of couplers 103.

Each register-section-selecting train includes a plate 105 which, as it is traversed by a register-section-selecting tappet 106 on the carriage 49, Figure 17, for placing is in depressed position, is in the corresponding section of couplers 103 in effective position; the rest of the train including, in order, a slide 107, a push-rod 108, a lever 109, connections from said lever 109 to a rock-shaft 110, and a coupler-section shifter 111 operable by said rock-shaft 110. Said connections are adapted according to the relative placement of said lever 109 and rock-shaft 110, the several levers 109 being grouped, Figure 3, on a common fulcrum rod 112 while the array of the several rock-shafts 110 is spread across the machine.

The several cam-plates 105 are spaced parallelly and grouped as in Figure 4, and are guided by upper and lower combs 113 provided on side walls 114 of the housing 83. Each cam-plate 105 has an upper edge contour 115 proportioned relatively to the tappet 106 so that the latter at its engagement with said contour maintains said cam-plate 105 depressed, and the companion section of couplers 103 in effective position, while the carriage traverses a zone of the same number of denominations (six) as the register-section. The tappet 106 depresses the cam-plate 105, by overriding the bevel 116, as the carriage moves to the higest denomination of said zone, and said tappet leaves the cam-plate at a similar bevel for consequent restoration of the cam-plate 105 and the rest of the described train as the carriage moves from the last or lowest denomination of said zone. Said train, together with its section of couplers 103, is restored by a spring 117 which may act on the rock-shaft 110 as indicated in Figure 3. The spring-pressed-restoring movement of the train is limited as by abutment of the end of a guide-slot 118 in the coupler-shifter 111 with a guide-stud 119, said rock-shaft 110 having an arm 120, and a stud 121 thereon, engaging a slot 122 of the coupler-shifter 111.

A register-bar-guiding plate 123, attached, for each register-unit, to bosses 102ª on the frame-work-cross-member 102, mounts the two coupler-shifters 111, for said register-unit, by means of said guide-stud 119 and guide-studs 124, Figure 12. The couplers 103 extend forwardly through an opening 123ª in said plate 123, and the coupler-shifter 111 has, within said opening 123ª, a shoulder 111ª, and also has, behind said plate 123, a portion 111ᵇ to engage the couplers 103.

The connections from the levers 109, on the common fulcrum rod 112, to their companion rock-shafts 110 include levers 125, each engaged by the companion lever 109, as at 126, Figure 3. Said levers 125 are shown, Figure 3, arranged in two groups, each group having a common fulcrum-stud 127 projecting from the cross-member 102 of the computing-base framework. The levers 125 in each group may be connected to arms 128 of the corresponding rock-shafts 110 by links 129, or by pin-and-slot connections as at 130, Figure 3. The rock-shafts 110 may be journaled in lugs 131 on said cross-member 102. The push-rods 108, pivotally connected at their lower ends to the levers 109, are guided at their upper ends by plates 132 provided in the computing base B and project above said plates for engagement with the companion slides 107 which work in upper and lower slotted cross-bars 134 provided in the housing 83. The relatively crossed groups of cam-plates 105 and slides 107 are appropriately connected by tabs 135 which may be provided on said slides 107.

Half of the several cam-plates 105 may have their tappet-engaged edges 115 laterally offset as a group from the group of similar edges 115 of the other half of said slides as in Figure 4. The right-hand and left-hand groups of said tappet-engaged edges 115 correspond inversely with the left-hand and right-hand sections of the several register-units, it being remembered that the carriage moves from the highest to the lowest denomination in leftward direction while the progression of the register denominations from the highest to the lowest is to the right. There is similar transposition in the orders in which the master-racks 96 and the distributive racks 99 of the denomination-selecting trains are connected to the bed of cross-blades 98. Each denomination-selecting train is urged by a spring 138ª, attached to the master-rack 96, to normal position determined by a stop, not shown, which engages the cross-blade 98.

The punctuation jacks 86, and a dummy jack 138, connected to a key-locking train, work as a unit by means of a bail 137 pivoted to the housing 83 and articulated to said jacks 86, 138 by pin-and-slot connections 136. The key-lock train, Figures 18 and 19, includes a push-rod 91ª connecting the dummy-jack 138 to a bell-crank 94ª which in turn is connected to an arm 139 on a rock-shaft 140, having an arm 141 connected by a link 142 to a rock-shaft 143, Figure 18. Said rock-shaft 143, an arm 144 thereon, a series of tumblers 145, and pendent stems 146 of the numeral-key levers form the usual Underwood-Hanson key-locking devices; the rocking of said shaft 143, effected at a punctuation space, causing said arm 144 to fill the usual gap in the series of tumblers to block said pendent stems 146, and thereby lock said numeral-key levers. The key-lock and punctuation-jack train is restored, as the tappet 82 leaves the punctuation jack, by a spring 147, Figure 2, pulling on an arm 148 of the rock-shaft 140, said arm 148 stopping against a cross-bar 149 of the computing-base framework. The weight of the punctuation jacks 86, 138 and the bail 137 is counterbalanced in part by a spring 150 fastened to the face-plate 88 and pulling on said bail 137.

The tabulating counter-stop 80, the denomination-selecting tappet 82, and the register-section-selecting tappet or tappets 106 are incorporated, for each computing zone, in a tappet-unit 151, having novel features of improvement designed to facilitate the differential placement, on the tappet-unit, of the register-section-selecting tappets 106. The improvements also facilitate placement of the tappet-unit upon the rack-structure and provide for embodying the several constituent elements of the tappet-unit so as to conduce to the efficiency of said elements and economy of manufacture of the tappet-unit.

A main supporting rack 152 and an auxiliary rack 153 provided on the carriage 49 serve to support and locate the novel tappet-unit. A body-block 154 of the tappet-unit is jogged as at 155 and is grooved for a sufficient distance from the jogged end, as at 156, to form teeth 157 for articulation of the tappet-unit with rack-teeth 158 provided along the bottom of the main rack 152. A strip 159 of resilient metal, attached to the top of the body-block 154, as by screws 160, is formed into a clip 161 at its end, to engage a groove 162 in the top of the main rack 152 for removably attaching the tappet-unit to said main rack. Said strip 159 is also provided with teeth 163 whereby the tappet-unit engages the auxiliary rack 153, said teeth 163 being formed by a U-shaped element 165, secured to the strip as at 166, Figure 6.

The tabulating counter-stop 80 is formed integrally with the body-block 154. The denomination-selecting tappet 82 has a shank 82ª driven into the body-block 154, Figure 7, in order that said tappet 82 may be separately hardened, and ground and polished on its jack-engaging surfaces, to minimize wear and friction.

For differential placement therein of the register-section-selecting tappet or tappets 106, the bottom portion of the body-block 154 is provided with a sufficient number of transverse slots 168 corresponding in spacing with the cam-plates 105. Figures 5 and 6 show a tappet-blank 106ª having an upper edge 169 for bearing against the bottom of the slot 168, and of T-shape to afford shoulders 170 and side edges 171 which are engaged by keeper-plates 172, one of the latter being detachably fastened to each side of the body-block by screws 173, Figures 5 and 6. Each keeper-plate 172 is slotted or perforated as at 174 to form a border-portion 175 which fits under the shoulders 170 and against the side edges 171 of the tappet-blank 106ª and keeps the latter firmly in place, Figure 6. Upon removal of one and loosening of the other of the keeper-plates 172, the placement of one or more of the tappet-blanks 106ª in the appropriate slot or slots 168 may be easily effected, whereupon the keeper-plates 172 may be secured again by the screws 173 to firmly keep the tappet-blank 106ª in place.

A roller 177, provided upon the rear end of the tappet-unit 151, fits a track 178, supported by the housing 83, to brace the tappet-unit 151 as it traverses the localized group of register-controls comprising the register-section-selecting cam-plates 105, and the jacks 81, 86.

The tappet-unit 151 is shown provided with a tooth 179 for rocking a cycling trip-lever 180 traversed by the carriage 49 and pivotally supported by the plate 88. Said lever 180, incorporated in the typewriter-unit A, is connected as at 181 to a train, similar to the denominational jack-train, and comprising rods 176, 176ª, and a bell-crank 182, Figure 4, to work a lever, in the computing base B, comprising an arm 183 engaged by said bell-crank 182 and an arm 184, joined to the arm 183 by a yoke 185, the lever 183, 184, 185 being loosely fulcrumed upon the rock-shaft 140. Said arm 184 of said lever engages an arm 186 of a rock-shaft 187, to rock the latter, to trip a clutch-mechanism 204, Figure 32, to connect a suitable power drive (not shown) to a shaft 188 for cycling the latter by power. Said shaft 188 may have a connection to drive the general operator which includes the register-bar-driving cross-bar 76 for reciprocating the latter at a revolution or cycle of said shaft 188. Said connection, not shown, may be of the kind shown in my co-pending application No. 15,789, filed April 11, 1935, and, briefly described, comprises a crank, not shown, on said shaft 188 and a pitman, not shown, connecting said crank to one of the side plates 189 which connect said cross-bar 76 to the usual side-racks 190 of the general operator, said side-racks 190 being each geared to the usual cross-shaft 191, Figure 2, as described in my aforesaid Patent 1,927,951.

Said clutch mechanism 204 may be as shown in Patent 1,299,646 to Wood, dated April 8, 1919, and includes a power operable toothed collar 204ᵃ, Figure 32, normally loose on the shaft 188. Upon releasing a control-disk 205ᵃ, by withdrawing an arm 206ᵃ, Figures 15, 32, 33, therefrom through the described rocking of said trip-shaft 187, a clutch disk 207ᵃ fastened to said shaft 188 becomes connected to said collar 204ᵃ for an ensuing revolution or cycle of said shaft 188.

The diagram at Figure 28 exemplifies a set-up, on the carriage 49, of the tabulating counter-stops and tappet devices relative to the localized group of the tabulating and register controls 75, 81, 105, said set-up being for work-sheet form 193. The first column of said form 193 is for amounts which total no more than six denominations and are to be entered, by way of example, in the register section consisting of the six lowest denominations of the first twelve-denomination register-unit from the left in the computing base. The set-up includes accordingly for said first column a tappet-unit (151¹ in Figure 28), which has, besides the counter-stop 80 and the denomination-selecting tappet 82, a register-section-selecting tappet 106 located on said unit 151¹ for engaging the edge 115 of the second cam-plate 105 from the front, Figures 4, 28.

At the operation of one of the tabulating keys 74 of the six lowest denominations, the carriage will advance and be arrested as the counter-stop 80 of said unit 151¹ strikes the carriage-stop 75 projected by the operated tabulating key 74. At release of said tabulating key 74 and retraction of the stop 75, the carriage settles as usual at the corresponding denomination, and said second cam-plate 105 from the front will have been depressed by the tappet 105 of said unit 151¹, and thereby the section of couplers 103, controlled by said second cam-plate from the front, will have been moved to effective position to connect the section of register-bars of the six lowest denominations of the first register-unit to the corresponding denomination-selecting trains, which it will be remembered include the jacks 81 traversable by the tappet 82 of said unit 151¹.

It will be seen now that said tappet-unit 151¹ can select no other register-section in the computing base but the one represented by its particularly placed tappet 106, namely, the section consisting of the six lowest denominations of the first register-unit from the left. The desired register-section having thus been selected for said first column, the printing of an amount proceeds as usual, and concomitantly the amount is indexed in the appropriate ones of the register-bars 62 of the six lowest denominations of the first register-unit. Following the printing and indexing of the amount, the general-operator cross-bar 76 is reciprocated to actuate the indexed register-bars to accumulate the indexed amount in the computing wheels 61, which become engaged with the idlers 63 or racks 64 as will later on be described, the accumulation being limited to the computing wheels of the six lowest denominations of the first register-unit, inasmuch as no total of amounts entered in said first column exceeds six denominations.

Suitable carry-over mechanism (not shown) is provided in association with the computing wheels 61 of each register-unit. For example, said carry-over mechanism may be of the kind shown in my aforesaid Patent 1,927,951.

The second column of the work-sheet form 193 in Figure 28 is also for amounts or totals not exceeding six denominations, and, by way of example, said amounts are to be accumulated in the register-section consisting of the six lowest denominations of the middle register-unit of twelve denominations in the computing base B. A tappet-unit (151² in Figure 28) for said second column is accordingly provided in the set-up and has, besides the counter-stop 80 and denomination-selecting tappet 82, a register-section-selecting tappet 106 located to engage the cam-edge 115 of the fourth cam-plate 105 from the front, Figures 4, 28. Thus, by tabulating the carriage to the second column position and desired denomination therein, said fourth cam-plate 105 will become depressed and the corresponding section of couplers 103 become moved to effective position to connect the section of register-bars 62, consisting of the ones of the six lowest denominations of the middle register-unit, to the corresponding denominational trains. The amount printed in said second column will, therefore, be indexed and accumulated in the register-section consisting of the six lowest denominations of said middle register-unit.

The third column of the form 193 is also for amounts or totals not exceeding six denominations, said amounts to be entered, by way of example, in the register-section consisting of the six highest denominations of the middle register-unit. The six lowest denominations of tabulator-keys 74 and corresponding stops 75 are used to tabulate the carriage to the third column position irrespective of the use of a register-section consisting of the six highest denominations of a register-unit. A tabulating stop 80 is therefore placed, for said third column, with reference to said six lowest tabulating denominations. But the register-section-selecting tappet 106 and denomination-selecting tappet 82 are offset six denominations (not counting punctuation spaces) to the right of said third-column tabulating stop 80. The provision for the third column, in the set-up of tappet-units on the carriage, may therefore include, Figure 28, two complementary units 151³. One of said complementary units 151³ has only the counter-stop 80 and is placed on the carriage with reference to the aforesaid use of the tabulating stops 75 of the six lowest denominations. The other complementary unit 151³ has a denomination-selecting tappet 82, and also has a register-selecting tappet 106 placed to engage the edge 115 of the third cam-plate 105 from the front, Figure 4, said other complementary unit 151³ being placed to effect the aforesaid offset, of its tappets 82, 106, of six denominations to the right of said counter-stop 80.

By the described offsetting of the counter-stop 80 from the tappets 82, 106 for said third column, the section of denominational jacks 81, which comprises what are ordinarily the six highest denominations of the full complement of jacks 81, is denominationally correlated to the section of counterstops 80 of the six lowest denominations. For example, if the tabulating key 74 for the tens of hundreds denomination is pressed to position the carriage for typing, in the third column of the form 193, the amount 75.49, the carriage-stop designated s in Figure 28 will be projected and will arrest the resulting advance of the carriage by engaging the counter-stop 80 of the unit 151³ which is offset as described, relatively to the tappets 82, 106 for said third column. With the carriage thus positioned, the denomination-jack marked d, in Figure 28, and the third cam-plate from the front will have become depressed, respectively, by said third-column tappets 82, 106, and therefore, as the amount 75.49 is printed, it will become concomitantly indexed in the register-section consisting of what are ordinarily the six highest denominations of the middle register-unit of twelve denominations.

The fourth column of the form 193 is for amounts or totals up to twelve denominations, said amounts being entered, by way of example, in the right-hand register-unit of twelve denominations. A tappet-unit (151⁴ in Figure 28), for said fourth column, includes, besides the counter-stop 80 and the denomination-selecting tappet 82, two of the register-section-selecting tappets 106 placed to respectively engage the edges 115 of the fifth and sixth cam-plates 105 from the front, Figures 4 and 28. Thus, while the carriage traverses the six highest denominations for said fourth column of the form 193, the fifth cam-plate 105 from the front will be depressed, and thereby the section of six couplers 103 of highest denominations will have become shifted to effective position to connect the six highest denomination-register bars 62 of the right-hand register-unit to the corresponding section of denominational trains. Then, as the carriage reaches and tranverses the six lowest denominations for said fourth column, the sixth cam-plate will become depressed, and thereby, in turn, the six lowest denomination-register bars 62 of said right-hand register-unit will become operatively connected to their corresponding section of the denominational trains.

Full use of a register-unit, as, for example, for the twelve-denomination fourth column of the form 193, may also be provided for, by having, instead of the two cam-plates 105 for said unit, a single cam-plate 194, Figure 14, having a cam-edge 194ª substantially coextensive with all of the denominations of the register-unit. Only one cam-plate-depressing tappet 106 is provided in the tappet-unit 151 for depressing said cam-plate 194, and the latter is connected to simultaneously depress both slides 107 for said register-unit, and thereby simultaneously move both sections of the couplers 103 for said register-unit into effective position which is maintained while the carriage traverses a zone at which the full register-unit is used. 195, Figure 14, represents an offset with which the cam-plate 194 is provided to reach the offset tab 135 of one of the slides 107, the tab of the other slide being directly under the cam-plate 194. A keeper-bolt 192, Figures 13, 15, is screwed into the housing 83 to extend through the cam-plates 105, and is removable for interchange or replacement of said cam-plates.

It will be evident in the foregoing description concerning Figure 28 that the accumulation of some amounts in one section of a register-unit and of other amounts in another section of the same register-unit is exemplified by the accumulation of the second and third column amounts respectively in the right and left sections of the middle register-unit.

It will also be evident that the provision for sectional use of the large register-units makes it feasible to have the first three columns of the form 193 each no wider, substantially, than the illustrative six denominations (plus punctuation spaces) needed for the amounts entered in said first three columns.

Provision for sectional use of the register-units also extends the range of usefulness of the machine. For example, where previous machines, of the Underwood-Hanson class, having three registers, each of say twelve denomination capacity, could only accumulate three totals, by using all three of said register-units, even though none of the totals exceeded six denominations, the present machine can accumulate said three totals of six denominations each, by using only two of the three register-units, and still have left for other totals a section of one of said register-units and the entire third register-unit, the latter being usable either sectionally for small totals, or in full for totals up to twelve denominations.

For facilitating preparation of a set-up of tappet-units, and for quick replacement of one set-up by another as when the work-sheet form is changed, novel supporting structure for the tappet-units, Figures 4, 6, 26 and 27, is arranged for removal and replacement upon the carriage 49. In said structure the main tappet-unit supporting rack 152 is included and has attached to each of its end portions an arm or plate 196 having an upturned ear 197 supporting an end of the auxiliary rack 153, the plates 196 and the racks 152, 153 thus forming a frame 198 which for removable attachment to the carriage 49 is provided with posts 199. For supporting said frame 198, the carriage 49 has a transverse angle-bar 200 secured at the ends of its vertical leg by screws 201 to upturned ears 202 of carriage-brackets 203. The horizontal leg of said angle-bar 200 has a longitudinal slot 205 at one end and a transverse slot 206 at the other end for articulation with the frame-posts 199, for which purpose each of the latter is provided with a groove 207 designed to fit the thickness of the angle-bar 200 at said slots. A frame securing catch 208 is pivoted to the frame 198 by a headed pivot 209 and has a hook 210 to engage a pin 211 provided on the frame 198 near the transverse slot 206.

Figure 27 shows the frame 198 with one of its posts 199 first inserted in the longitudinal slot 205 preparatory to swinging said frame clockwise to enter the other post 199 in the transverse slot 206. A spring 213 automatically snaps the catch 208 into engagement with the pin 211 as the frame becomes entered in said transverse slot 206. Said catch 208 is turnable to the dotted outline position, Figure 26, to release the frame 198 preparatory to withdrawing it from the transverse slot 206 for removal from the carriage, the removal being completed by sliding the frame endwise out of the longitudinal notch 205. Stops 214 limit the displacement of the catch 208. The auxiliary rack 153 is adjustable endwise by means of a screw 215 and nuts 216 which secure it at one end to the companion ear 197, and the other end of the auxiliary rack may be splined to the other ear 197 as at 217, Figure 4, to hold said rack against turning.

The tappet-unit set-up frame 198 is provided with a cross-bar 219 which supports a letter-space scale 220 by which the tappet-units 151 are set; said cross-bar being fastened at its ends to the plates 196 together with spacers 221 which serve to dispose said cross-bar above the tappet-units 151, each of the latter having an index 222 to read on said scale 220. The catch-pivot 209 may serve to fasten one end of the cross-bar 219 and the underlying spacer 221 to the plate 196. At the other end of the cross-bar, the parts, including one end of the scale 220, may be fastened together by a screw 223, the other end of the scale being secured to the cross-bar 219 by a screw 224.

The main rack 152 is shown provided, at a suitable number of points intermediate its ends, with studs 225 to bear at said points against the bottom of the horizontal leg of the angle-bar 200 which thus co-operates to support the frame 198 against deflection induced by engagement of the tappet-units with the register-controls. The angle-bar 200 in turn may be supported against upward deflection by having the upper side of its horizontal leg bear against a roller 227 mounted on a bracket 228 attached to a plate 229 forming part of the housing 79. Bevels 226 at the edge of the angle-bar 200 guide the studs 225 under said angle-bar as the frame 198 is placed upon the carriage.

It will be seen that the setting-up of the tappet-units is facilitated since it may be done in the frame 198 while the latter is detached from the machine. Several of the frames 198, each having a prearranged set-up of tappet-units for a certain work-sheet form, may be provided, so that when a change from one form to another is made, the corresponding change in the tappet-unit set-up may be quickly effected by an interchange of the prearranged frames 198.

Following the indexing of an amount in the register-bars 62 and preceding the advance of the latter by the general-operator cross-bar 76, the entire set of computing wheels 61, in each twelve denomination-register unit which has been called into play by means of the carriage-controlled register-section-selecting trains, is shifted into mesh with either the corresponding idlers 63 or the register-bar racks 64. For this purpose, and for disengaging said computing wheels precedent to the return of the register-bars, use may be made of the computing-wheel shifting mechanism and state-controlling mechanism disclosed in my co-pending application No. 607,275, filed April 25, 1932. Said mechanism may be briefly described as follows.

Each twelve-denomination unit has a state-controller 230, Figures 1, 2, 9, 10, 11, 12, 15 and 16, extending fore and aft along the bottom of the computing base B and urged forward by a spring 231. An upright latch-rod 232 projecting through a guide-plate 233 normally engages a shoulder 234, Figure 11, of the state-controller 230 to keep the latter in neutral position. The upright latch-rod 232 is further guided by the register-guide-bar plate 123 and pins 235, Figure 9, therein. Headed screws 236 slidably support the state-controller 230 at its rear end-portion and at its forward end-portion the state-controller works in a guide 237 provided on a frame-cross member 239, Figure 1.

A cam 238, Figure 10, on the state-controller works a cross-slide 239ª, mounted on the guide 237, Figure 1, whereby a U-shaped member 240, connected to said cross-slide 239ª and splined to a computing-wheel-shifting rock-shaft 241, is shifted along the latter to engage either a yoke 242 having side arms 243, or an arm 244. Said yoke 242, with its side arms connected to the shiftable computing-wheel frame 65 by links 245, is normally loose on the rock-shaft 241 as is also the arm 244, the latter having a slot 246 for its connection to said frame 65 at 247. Upon the retraction of the latch-rod 232 the resulting forward shift of the state-controller 230 is limited by a secondary latch-rod 249 engaging a shoulder 250, Figure 11, of said state-controller. Such limited state-controller shift acts, through the cross-slide 239ª and companion member 240, to couple the arm 244 to the computing-wheel rock-shaft 241. Upon retraction of a secondary latch-rod 249 the resulting further shift of the state-controller 230 acts to couple the yoke 242, 243, instead of the arm 244, to the computing-wheel rock-shaft 241.

With the arm 244 coupled to the rock-shaft 241, as a result of retracting only the primary latch-rod 232, the rocking of said shaft 241 clockwise of Figure 1 will swing the frame 65 downwardly about an axle 251 for the idlers 63, to mesh the computing wheels 61 with the racks 64 for additive rotation of said wheels. With the yoke 242, 243, instead of said arm 244, coupled to the rock-shaft 241, as a result of retracting also the secondary latch-rod 249, the clockwise rocking of the shaft 241 will shift the frame 65 rearwardly to mesh the computing wheels 61 with the idlers 63 for subtractive rotation of said wheels. The rock-shaft 241 remains rocked during the advance of the register-bars 62. Before the return of the latter, said shaft 241 is rocked to its normal position, to thereby unmesh the computing wheels 61 from the racks 64 or idlers 63. By means of operating connections not shown, but which may be of the nature described in my said co-pending application No. 607,275, said rock-shaft 241 is worked in timed relation to the reciprocation of the general-operator cross-bar 76. By means of other connections not shown, a state-controller restorer 252 is worked in conjunction with the return stroke of the general-operator cross-bar 76 to restore the state-controller 230, cross-slide 239ª and rock-shaft-coupling member 240 to normal positions, following the unmeshing of the computing wheels 61, the latch-rods 232, 249 being urged by springs, not shown, to reengage the restored state-controller.

The secondary latch-rods 249 for the several register-units are connected as at 254, Figure 2, to a rock-shaft 255 for joint retraction by the rocking of said shaft 255. Said shaft 255 may be rocked, to retract said latch-rods 249, by means of a manually-operable subtraction-key mechanism not shown, or a carriage-controlled subtraction-setting mechanism not shown, said mechanisms being of the nature described in my said co-pending application No. 607,275.

Novel provision is herein made whereby the addition latch-rod 232 of a register-unit is retracted conjointly with the carriage-effected selection of a section of said register-unit, but irrespective of which section is selected, and said provision is shown embodied in the following devices, Figures 8, 9, 10 and 12.

A latch-rod-retracting lever 256 is fulcrumed behind the register-bar guide-plate 123 on a stud 257 and is articulated to the primary latch-rod 232, as at 258, Figure 10. At operation of one of the register-section-selecting trains for the register-unit by means of the carriage-tappet 106, said lever 256 is rocked clockwise from the Figure 9 position to retract the latch-rod 232. For this purpose, the stud 121 of the coupler-shifter-actuating rock-shaft 110 of each train is operatively connected to said lever 256; said lever 256 being directly engageable by the stud 121 of one rock-shaft 110, and the stud 121 of the other rock-shaft 110 of the register-unit engaging an intermediate lever 261, fulcrumed behind the plate 123 on a stud 262, said intermediate lever, in turn, engaging said latch-rod-retracting lever 256. As the left-hand coupler-shifter 111, at Figure 9, is raised by its rock-shaft 110 to move the corresponding section of couplers 103 to effective position, the stud 121 directly engages the lever 256 and rocks the latter to retract the latch-rod 232 as illustrated in Figure 9. Should the right-hand coupler-shifter 111 be raised by its rock-shaft 110, the latter, through its stud 121, will rock the intermediate lever 261 counterclockwise, thereby, in turn, rocking the latch-rod-retracting lever 256 to retract the latch-rod 232 as in Figure 12.

Thus the operation of selecting either section of the register-unit retracts the latch-rod 232 for resulting release of the state-controller 230 to predetermine additive rotation of the computing wheels 61. If, in addition to the thus effected retraction of the primary latch-rod 232, the secondary latch-rod 249 is also retracted, as by operation of the subtraction-key mechanism, the resulting further movement of the state-controller 230 predetermines subtractive, instead of additive, rotation of the computing wheels 61.

Provision for insuring restoration of the couplers 103 includes a cam-slide 253 which has notches 259 forming cams 260 for engaging the studs 121 of the coupler-shifting rock-shafts 110. Said cam-slide 253 is slidably guided by slots 263 of the framework cross-member 102 and by studs 264 on the frame 67 and is yieldably held by a spring 286 in normal position, Figure 3, in which said notches 259 clear said rock-shaft studs 121. A push-rod 253ª, connected to said cam-slide 253, is slidable in a lug 102ᵇ of said cross-member 102 and has its end normally in the path of a cam 264ª formed by a slot 296 in the general-operator rack 190. Thus, during the advance stroke of the general operator, said rack-cam 264ª acts to displace said cam-slide 253 to the Figure 8 position to depress any stud 121 which may have remained in raised position, thereby insuring restoration of the coupler-shifters 111 and couplers 103 to their normal ineffective positions.

The novel mechanism for rendering the register and computing-base controlling trains incapable of actuation by the carriage under certain conditions will now be described.

It will be remembered that the bell-cranks 94, 94ª and 182, forming part of the denomination and punctuation jack-trains and cycle-tripping train, have the common fulcrum-rod 85, and that the levers 109 of the register-section-selecting trains have the common fulcrum-rod 112. By appropriate displacement of said fulcrum-rods from their normal positions, a slack is formed in said trains relatively to the tappets 82, 106 and the cycle-tripping tooth 179 on the carriage as indicated in Figures 15, 16, and said trains are thereby disabled. A rock-shaft 265, journaled in posts 266, on a cross-bar 267 of the computing-base framework, Figure 3, is rockable to effect displacement and restoration of said fulcrum-rods 85, 112, said rock-shaft 265 having upright arms 268, supporting the fulcrum-rod 85, and horizontal arms 269, from which links 270 depend and support the fulcrum-rod 112.

A latch-arm 271 is mounted on a rock-shaft 272 and is connected to the latter by a one-way-yieldable connection, comprising a spring 273 and rock-shaft arm 274. Said latch-arm 271 normally engages a step 275 of an arm 276 of the fulcrum-rod-controlling rock-shaft 265, to hold the latter and the fulcrum-rods 85, 112 in the normal, Figure 2, positions, whereby the aforesaid trains are in condition for actuation by the carriage. Upon withdrawing the latch-arm 271 therefrom, said arm 276 is turned by the weight of the parts, and thereby rocks its shaft 265 until a second step 277 on said arm 276 stops against the withdrawn latch-arm 271. Thus the withdrawal of said latch-arm 271 results in the fulcrum-rod 85 being instantaneously displaced rearwardly and the fulcrum-rod 112 downwardly to the Figure 16 positions, to instantaneously disable said trains. Upon disablement of said trains the cam-plates 105 and slides 107 may drop to the Figure 15, 16, position wherein said slides rest upon a cushioning pad 279ª provided upon one of the slide guiding cross-bars 134. Slotted guides 278 on the cross-bar 267 guide the pendently-supported fulcrum rod 112.

Figure 16 shows the usual Underwood shift-rail-frame 279 moved by the case-shift key-lever 280 to shift the platen-frame 50 to upper-case position. By such shift to upper case, an arm 281, provided on said shift-rail frame 279, works, through a link 282, to depress a lever 283 fulcrumed, in the computing base, on the rock-shaft 140. By means of a cam-roll 284 thereon, said lever 283 displaces, as it is depressed, an arm 285 of the shaft 272, to rock the latter, to withdraw the latch-arm 271 from the first step 275 of the arm 276, and thereby effect the above-described disablement of said register-controlling trains. Thus at use of the numeral-key levers 45 for upper-case typing, at a zone, which in lower case is a computing zone, indexing of the register-bars 62 is prevented.

At the shift to upper case and the accompanying depression of the lever 283, a side lug 287 of the latter, Figures 16, 33, idly passes a spring-pressed pawl 288 pivoted to an arm 289 of the cycle-clutch-tripping rock-shaft 187, said pawl being momentarily turned by said lug to the dotted outline position, Figure 16, and then snapping back against a stop 290, as said lever 283 becomes fully depressed. But upon restoration to lower case, by release of the shift-rail frame 279, and the accompanying rise of the lever 283, the lug 287 encounters the pawl 288, and thereby rocks said shaft 187 to trip the cycling clutch 204. In the resulting power-driven revolution of the shaft 188, a cam-roll 291, on a disk 292 mounted on said shaft 188, works against a flange 293 of the arm 276, see Figure 30, to restore said arm 276 and its shaft 265, whereupon a spring 294, Figure 16, acts by means of the arm 274 to urge the latch-arm 271 back under the step 275 of said arm 276. Said restoration of the parts by the cycling shaft 188 renders the register-control trains and cycle-tripping train actuable by the carriage again. A cam 295 of said shaft 188, works against a roll 297, on said latch-arm 271, Figure 30, to insure restoration of the latter.

It will be seen that the effort required to trip the described latch-device, that is, to withdraw the latch-arm 271, to render said trains inoperative, is negligible, and therefore does not impair the usual ease of key-touch of the case-shift key-mechanism. Moreover, said trains are disabled instantaneously, that is, in immediate response to a shift to upper case. The power-driven shaft 188, which is caused to be operated as described at the return to lower case, takes up the burden involved in disabling and restoring said trains.

Provision is also made whereby at engagement of a power-operated carriage-return mechanism the latch-arm 271 is tripped to cause the register and computing-base control-trains to be disabled so as to be inoperable by the carriage during a carriage-return run and whereby further, at the conclusion of said run, said cycling shaft 188 is caused to be actuated to render said trains operative again.

Carriage-return mechanism herein shown, Figure 2, is substantially as described in my Patent 1,624,068 dated April 12, 1927, and includes a rack 298 on the carriage meshing with a driving pinion 299 having clutch-teeth 300, said pinion being normally disengaged from a clutch-head 301 of a shaft 302 which is operable by power devices, not shown, and mounts said pinion 299. By manual operation of a carriage-return key 303, or by automatic operation of a lever 304 by the carriage 49 at the end of a line of typing, a latch-bar 305 is released at 306 for a resulting rearward movement by spring 307 to actuate linkage to move the pinion 299 into engagement with the driving head 301 for a return movement of the carriage 49. Said linkage includes a pinion-shifting rock-shaft 308 and an intermediate rock-shaft 309. At the conclusion of the carriage-return run the linkage is actuated to disengage the pinion 299 from the driving head 301 and for this purpose is connected to a carriage-controlled rock-shaft 310 by parts 311, 312, 313 and 314, Figure 2.

Referring now to the aforesaid provision, a lever 315, pivoted to the computing-base framework at 310ª, is depressed by engagement of the carriage-return mechanism and as it is depressed a side-lug 316 thereof idly passes the pawl 288 on the arm 289 of the cycle-tripping rock-shaft 187. The pawl 288 consists of two similar portions 288ª, Figures 32, 33, each portion having the form seen in the side view at Figure 16, and said portions having a connecting hub 288ᵇ. The duplex pawl 288 pivots on a stud 317 of the arm 289, and a spring 318 normally presses the pawl against the stop 290, which is engaged by one of the pawl-portions 288ª. One pawl-portion 288ª is engaged by the lever 283 which coacts with the case-shift mechanism, and the other pawl-portion 288ª is engaged by said lever 315 which coacts with the carriage-return mechanism. The connections of said lever 315 to the carriage-return mechanism include an arm 319 of the intermediate rock-shaft 309, a link 320 therefrom to a bell-crank 321 pivoted to the housing 83, and a link 322 from said bell-crank connected to said lever 315 by a pin-and-slot connection 316ª. Said link 322 extends below said lever 315 and has a pin-and-slot connection 323 to an arm 324 of the rock-shaft 272 which mounts the latch-arm 271, whereby the latter is caused to be withdrawn to disable said register and computing-base control-trains at the engagement of the carriage-return mechanism. Said pin-and-slot connection 323 enables the shaft 272 to be rocked independently of the carriage-return mechanism.

At the conclusion of the carriage-return run, the counter-rotation of the intermediate rock-shaft 309 to disengage the carriage-return pinion 299 is effected and the depressed lever 315 is concomitantly raised, causing its side-lug 316 to override the pawl 288 and thereby rock the cycle-tripping shaft 188. The resulting cycle of the power-operated shaft 188 causes the restoration of said register and computing-base control-trains in the manner hereinbefore described.

Depression, manually, of a cycling key 326, Figure 29, rocks a bell-crank 327, pivoted to the machine-frame at 328, and thereby thrusts rearwardly a link 329, slidably supported on said frame as at 330, to displace an arm 331 of the cycle-tripping rock-shaft 187, and thereby rocks the latter to cause a cycle of the shaft 188 for reciprocating the general-operator cross-bar 76 which, it will be remembered, is operatively connected to said shaft 188.

During the cycling of the shaft 188 and general-operator cross-bar 76, it is desired to have the register and computing base control-trains disabled, so that if the cycle occurs while the carriage is still in a computing zone, a register-bar 62 will not be in slightly advanced position to obstruct the engagement of the computing wheels 61. A roll 333 on the disk 292 of the shaft 188 acts at the start of the cycle to withdraw the latch-arm 271 to cause disablement of said control-trains in the manner above described; said roll 333 engaging a roll 334 on a branch 335 of said latch-arm 271, to withdraw the latter for a resulting drop of the arm 276 and concomitant disablement of said trains, as in Figure 15. Near the end of the cycle or revolution of the shaft 188, the roller 291 and the cam 295 of the shaft 188 act to restore the arm 276 and latch-arm 271 in order that said control-trains will be operative again after the cycle.

When it is desired to use the machine solely for typing, both in upper and lower case, a non-compute key 336 is operable for withdrawing the latch-arm 271 to thereby render the register-control trains, and the cycle-tripping train which extends from the lever 180, incapable of operation by the typewriter-carriage 49 at such typing. Said non-compute key forms part of a bar 337, having a slot 338 fitting a guide 339 on the machine-frame. Said bar 337 is connected at 340 to an arm 341, which is joined to another arm 342 by a yoke 343, Figures 32, 33, both arms being fulcrumed on the rock-shaft 272 which mounts the latch-arm 271.

With the machine operative for computing, the non-compute key-bar 337 is in the forward or "on" (computing) position, Figure 29, determined by abutment of a lug 344 thereof against the guide 339.

To condition the machine for typing without computing, the non-compute key-bar 337 is shifted rearwardly to "off" position, Figure 31, thereby rocking the joined arms 341, 342, and the shaft 272 to withdraw the latch-arm 271 for the resulting disablement of said register-control and cycle-tripping train, the arm 342 working against an arm 345 of said rock-shaft 272; said arm 345 forming a one-way connection which permits said rock-shaft 272 to be operated independently of the non-compute key-mechanism. By means of a side-lug 346 thereon, the arm 342, when rocked by rearward shift of the non-compute key-bar 337, engages the pawl 288 and turns it to the Figure 31 position, to thereby operatively disconnect the cycle-tripping rock-shaft 187 from the case-shift and carriage-return mechanisms. The non-compute key-bar 337 and the parts shifted thereby to the Figure 29 positions become locked in said positions, for maintaining the non-compute condition of the machine as long as desired, by a spring-pressed latch 347 which interlocks with a lug 348 of the arm 341 as the latter becomes rocked by the rearward shift of the non-compute key-bar 337. Said latch 347 is shown pivoted on the rock-shaft 149.

It will be seen that the turning of the pawl 288 to the Figure 31 position, by the rearward shift of the non-compute key, for establishing a non-compute condition of the machine, prevents the shaft 188 from being cycled when the case-shift mechanism or the carriage-return mechanism of the typewriter-unit is operated during said condition.

The non-compute condition of the machine, effected by means of the described non-compute key-mechanism, may be terminated and the machine conditioned for computing again by depressing the manual cycling key 326. At the resulting rocking of the cycle-tripping shaft 187, the arm 331 of the latter, engaging the latch 347 at 347ª, depresses said latch to release the arm 341, whereupon the non-compute key-bar 337, the arms 341, 342, and the pawl 288 become restored to their Figure 29 positions, a spring 349 co-operating to effect the restoration. At the cycling of the shaft 188, which results from the depression of the cycling key 326 for terminating the non-compute condition, the roll 291 and cam 295 of said shaft 188 act to restore the arm 276 and its rock-shaft 265, and thereby the register and computing-base control-trains are rendered capable of operation by the carriage 49 again.

The normal position of the cycle-tripping rock-shaft 187 is determined by the abutment of its arm 331 against a stop 350, Figure 29, and said position is yieldably maintained by a spring 351, said spring being sufficiently strong to hold said rock-shaft 187 while its pawl 288 is being by-passed, as hereinbefore described, by either one of the levers 283 or 315. The slot 338 of the non-compute key-bar 337 and its guide 339 limit the rearward shift of said bar.

The novel construction of the assemblage forming the register-bar 62 and its digit-pin devices will now be described.

In Figures 20 to 24, inclusive, 62ª designates a sheet-metal register-bar body which includes the computing-wheel-driving rack 64 and is reciprocatable in the rear guide-plate 123 and a front guide-bar 352, Figure 2. Said sheet-metal body 62ª is formed, by a bending operation, with upper and lower flanges which are transversely slotted to afford upper and lower courses of alternate notches 353 and guide-portions 354 for the digit-pins 67, 67°. Each digit-pin has a lateral spur 355 which stops against its upper guide-portion 354 to determine the retracted position of said digit-pin. A shoulder 356 of each digit-pin is opposed by the underlying guide-portion 354 to limit the depression of the digit-pin. In the space formed by the opposite sides of each two adjacent digit-pins, the spur 355 of one of said two digit-pins, and the underlying guide-portion 354, a restoring spring 357 for said one digit-pin is nested. To retain the restoring spring 357 for the "9" digit-pin, for which there is no higher adjoining digit-pin, there is provided a slug 358 having a tongue 358ª for insertion in a slot provided in the register-bar body 62ª.

The "0" digit-pin 67° of each register-bar is formed with a lateral tongue 359, Figure 20, for articulation with a slotted end 360ª of a lever 360 pivoted to the register-bar body at 361. Said lever 360 has an arm 362 engageable by a pin-restorer 363, Figure 2, which, by connections not shown, is worked in conjunction with the general operator to depress the "0" pins of the several register-bars near the end of the general-operator cycle. Each register-bar 62 is provided with a common latch-bar 364, which coacts with the digit-pins 67, 67°, so that the depression of any digit-pin momentarily displaces said latch-bar 364 and thereby causes restoration of a previously-set pin in said register-bar. The "0" digit-pins of all the register-bars in the computing base are normally depressed, so that the depression in a register-bar, at the indexing operation of any of its digit-pins from "1" to "9", causes the companion "0" digit-pin to be restored. Conversely, the said depression of the "0" digit-pins by means of their levers 360 and the restorer 363 at the cycling operation, causes the restoration of all the digit-pins which were depressed by the indexing operation.

The digit-pin latch-bar 364 has bent therefrom ears 365, and also has a flange 366 which is engaged by noses 367 of the digit-pins 67, 67°. A cover or retaining plate 368 for said digit-pins and their restoring springs 357, nested in the register-bar body 62ª, is secured by screws 369 to bosses 370 provided on the register-bar body 62ª. Said cover-plate 368 is provided with ears 371 in which pivots 372 provided on the latch-bar ears 365 are journaled, Figure 25. For proper location of the pivots 372 relative to the digit-pin-engaged flange 366 of said latch-bar, said ears 365, 371 may project into the register-bar body 62ª, the latter being therefore provided with ear-admitting perforations 373. Springs 374, which keep the latch-bar 364 in engagement with the digit-pins, are interposed between said latch-bar 364 and the register-bar body 62ª, Figure 23, and are retained by studs 375 provided on said body 62ª. The slotted end 360ª of the lever 360 may serve, in lieu of a guide-portion 354, to guide the "0" digit-pin 67° at the top, as represented in Figure 20, and thereby conduce to the feasibility of providing the described tongue-and-slot connection of said "0" digit-pin and lever 360. The digit-pin notches 353 and guiding portions 354 are formed relatively to the register-bar body 62ª, so as to leave a web-portion 376, Figures 21, 22, between said guide-portions 354 to strengthen the latter. Perforations 377 in the latch-bar 364 give access to the cover-plate screws 369.

The described formation of the digit-pin-guiding elements 353, 354 on the register-bar body 62ª, the provision of the cover-plate 368, and the described pivoting thereto of the digit-pin and latch-bar 364 conduce to economy in manufacturing the register-bar, in that, by reason of these devices, said manufacturing consists principally of inexpensive punch-press operations. The operation of assembling the component parts of the register-bar and of servicing the latter is facilitated in that the digit-pins 67, 67° and their restoring springs are easily gathered in the register-bar body 62ª.

Variations may be resorted to within the scope of the invention, and portions of the improvements may be used without others.

Having thus described my invention, I claim:
1. In a combined typewriting and computing machine, the combination of a step-by-step feeding carriage, a key-set register including control-mechanism traversed by said carriage, a latch normally supporting said register-control mechanism in order that the latter may be operable by said carriage, said latch being trippable for instantaneously disabling said register-control mechanism relatively to said carriage, a register-control-mechanism silencer shiftable at will from an idle position to an effective position to thereby engage and trip said latch, a detent to releasably hold said silencer in effective position to indicate that said control mechanism is disabled, means actuable to restore said register-control mechanism, a normally disconnected power-operable actuator for said register-control-mechanism-restoring means, means, including a clutch, operable at will to connect said actuator and register-control-mechanism-restoring means for automatically actuating the latter, and means acting concomitantly with the operation of said last previously mentioned means to restore said silencer to idle position.

2. In a combined typewriting and computing machine, the combination of a step-by-step feeding carriage, a key-set register including control-mechanism traversed by said carriage, a latch normally supporting said register-control mechanism in order that the latter may be operable by said carriage, said latch being trippable for instantaneously disabling said register-control mechanism relatively to said carriage, a case-shift mechanism operatively connected to said latch so as to automatically trip the latter when a shift from normal case is effected, means actuable to restore said register-control mechanism, a normally disconnected power-operable actuator for said register-control-restoring means, and means, including a clutch, enabling said case-shift mechanism, by its return to normal case condition, to connect said actuator and register-control-restoring means for automatically actuating the latter.

3. In a combined typewriting and computing machine, the combination of a step-by-step feeding carriage, a key-set register including control-mechanism traversed by said carriage, a latch normally supporting said register-control mechanism in order that the latter may be operable by said carriage, said latch being trippable for instantaneously disabling said register-control mechanism relatively to said carriage, a carriage-return mechanism engageable to return said carriage, means whereby the engagement of said carriage-return mechanism automatically trips said latch, means actuable to restore said register-control mechanism, a normally disconnected power-operable actuator for said register-control-restoring means, and means, including a clutch, whereby, at the conclusion of a carriage-return mechanism, said actuator and register-return mechanism, said actuator and register-control-mechanism-restoring means are caused to become connected for automatically actuating the latter.

4. In a combined typewriting and computing machine, the combination of printing instrumentalities including a step-by-step feeding carriage, means conditionable for certain features of operation pertaining to said printing instrumentalities, register-mechanism including register-controls traversed by said carriage, means including a latch, to normally support said controls in operative relation to said carriage, said latch being trippable for disabling said controls, means whereby the conditioning of said conditionable means for said features of operation trips said latch, means actuable to restore said register-controls, a normally disconnected power-operable actuator for said register-control-restoring means, and means whereby the restoration of said conditionable means for concluding said features of operation connects said actuator and register-control-restoring means for automatically actuating the latter.

5. In a combined typewriting and computing machine having numeral-type keys, a letter-feed carriage, and indexable register-bars, the combination with indexing mechanism co-operating with said keys and carriage, said indexing mechanism including register-bar controls traversed by said carriage in a computing zone, of a latch-mechanism normally sustaining said controls in operative relation to said carriage and register-bars, said latch-mechanism being trippable, preparatory to movement of the carriage on certain occasions, thereby to disable said controls relatively to said carriage so as to enable said carriage to traverse said controls idly at said movement, and cycling mechanism actuatable subsequently to said latch-mechanism being tripped to restore the normal relation of said latch-mechanism and register-bar controls to render the latter operative by said carriage again.

6. In a machine of the class described, the combination of a typewriter having types, type-keys, a letter-feeding carriage, and a device employable for a certain typewriter operation; a register-mechanism including controls traversed and actuatable by said carriage, a latch-mechanism normally effective for supporting said controls in actuatable relation to said carriage, said latch-mechanism being trippable for disabling said controls relatively to said carriage, said latch-mechanism being operatively connected to said device, whereby, upon said device being employed for said certain operation, said latch-mechanism is tripped, a power-operable motor normally disconnected from said controls, means controlled by said device, to connect said motor to said controls, whereby, at the conclusion of said certain operation, said motor automatically restores said controls, a non-compute key settable from a normal position to a non-compute position, to trip said latch for disabling said controls and means whereby said non-compute key, when set to the non-compute position, renders said device, when employed for said certain typewrite operation during the non-compute state of the machine, inoperative to call said motor into use.

7. In a combined typewriting and computing machine, the combination of typing mechanism including a step-by-step feeding carriage, mean conditionable for a certain feature of operation of said typing mechanism, register mechanism including a register control device cooperative with said carriage, means including a latch, normally to support said control device in operative relation to said carriage, said latch being trippable for disabling said control device, means responsive, to the conditioning of said conditionable means for said feature of operation, to trip said latch, means actuatable to restore said register control device, a normally ineffective power operable actuator for said register control device restoring means, and means whereby the restoration of said conditionable means for concluding said feature of operation causes said power operable actuator to actuate said register control device restoring means.

HENRY L. PITMAN.

CERTIFICATE OF CORRECTION.

Patent No. 2,160,487.　　　　　　　　　　　　　　　　May 30, 1939.

HENRY L. PITMAN.

It is hereby certified that error appears in the printed specification of the above numbered patent requiring correction as follows: Page 12, first column, lines 55 and 56, claim 3, for the words "mechanism, said actuator and register-return" read operation effected by said carriage-return; and that the said Letters Patent should be read with this correction therein that the same may conform to the record of the case in the Patent Office.

Signed and sealed this 25th day of July, A. D. 1939.

(Seal)　　　　　　　　　　　　　　　　　　　　　Henry Van Arsdale,
　　　　　　　　　　　　　　　　　　　　　Acting Commissioner of Patents.